Figure 1:

W. G. ABBOTT, Jr.
DRAWN ELECTRODE.
APPLICATION FILED APR. 24, 1912.

1,157,280.

Patented Oct. 19, 1915.

WITNESSES:
Margaret E. Hooley
Helen Oxford

INVENTOR:
WILLIAM G. ABBOTT, JR.
BY Albert G. Davis
HIS ATTORNEY.

UNITED STATES PATENT OFFICE.

WILLIAM G. ABBOTT, JR., OF MILFORD, NEW HAMPSHIRE, ASSIGNOR TO GENERAL ELECTRIC COMPANY, A CORPORATION OF NEW YORK.

DRAWN ELECTRODE.

1,157,280.  Specification of Letters Patent.  Patented Oct. 19, 1915.

Application filed April 24, 1912. Serial No. 692,955.

*To all whom it may concern:*

Be it known that I, WILLIAM G. ABBOTT, Jr., a citizen of the United States, residing at Milford, county of Hillsboro, State of New Hampshire, have invented certain new and useful Improvements in Drawn Electrodes, of which the following is a specification.

My invention relates to luminous arc lamp electrodes, and its object is the production of an electrode of great and uniform density, which shall have a longer life than has heretofore been practicable and whose light giving properties are also increased.

This application is a continuation in part of my application Serial No. 564,489, filed June 1, 1910.

The so-called magnetite and titanium carbid electrodes, which are now widely used, are ordinarily constructed by filling into a metal tube, usually an iron tube, the magnetite or the titanium carbid mixture by grinding that mixture and gradually introducing the ground material into the tube, the lower end of which is closed, and shaking and jarring the tube while the filling is introduced, so as to compact the filling within the tube as much as possible. The compacting of the filling is also sometimes aided by a rod or plunger, the object being to put into the tube as much of the magnetite or the titanium mixture as possible. By this process of making the electrode the amount of material that can be compacted within of the tube is very limited, and moreover the density of the mixture in different parts of the tube is different. In consequence thereof the electrode has but a comparatively short life and its rate of consumption is not uniform throughout its whole length and the light emitted by the successive portions of the electrode is not the same.

It is the object of my invention to greatly increase the amount of material that can be compacted within the electrode tube and to make the electrode material of uniform and superior density throughout its whole length. At the same time by the process which I employ, the electrode can be made of a much smaller diameter than is practicable by the old process and the walls of the electrode can be made almost as thin as desired, whereby a very long, thin and flexible electrode is obtained which may be wound on a drum and gradually unwound from the same and fed toward the companion electrode. Mechanism for thus utilizing the thin, flexible electrode which can be made by my improved process I have shown in another application filed June 1, 1910, Serial No. 564,488; but my electrode need not necessarily be used with such mechanism but may be used with any of the well known arc lamp mechanisms.

Figure 3:
Figure 5:
Figure 2:
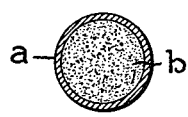
Figure 4:
Figure 6:

In the accompanying drawing I have illustrated the structure with which I start in the practice of my process, and two forms of electrodes resulting from that process as follows: Figures 1 and 2 show an elevation and cross-section, respectively, of the electrode blank with which my process starts; Figs. 3 and 4 illustrate in elevation and cross-section, respectively, a thin, flexible electrode resulting from my process; and Figs. 5 and 6 illustrate in elevation and cross-section, respectively, a stranded, flexible electrode resulting from my process.

The electrode blank, with which I start, is shown in Figs. 1 and 2, and this may be either a magnetite or a titanium carbid electrode of the ordinary kind, but for my process this electrode blank is made considerably larger in diameter than such electrodes which are designed for immediate use. By preference the electrode blank is made one inch in diameter and the tube $a$ has more than ordinary thickness. The filling $b$, which may be a magnetite mixture or a titanium carbid mixture, is supposed to have been filled into that tube in the ordinary way, compacted by shaking, and possibly by the use of a plunger. The electrode blank thus made, if used in a lamp, has the defects which I have heretofore pointed out. Now this blank, in accordance with my invention, is subjected either to a rolling or swaging or a drawing process, in the latter case through a number of successively smaller dies, whereby the walls of the tube become gradually thinner and the material within the tube becomes compacted very densely and uniformly throughout its whole length, so that its density is very much greater than the filling in the electrode blank, or, which is the same thing, in the ordinary electrode. By my process the rolling, swaging or drawing of the electrode can be continued until its diameter becomes very small and its walls very thin, the only limiting feature of this process being the limit of ductility of the material of the tube. If the process is arrested when a thickness of electrode, somewhat like that shown in Figs. 3 and 4, is obtained, such electrode may or may not be flexible; if it is flexible it may be wound on a drum and gradually unwound and fed to the arc, but if the process is stopped before the electrode becomes flexible, it may be cut into suitable lengths and used with any of the ordinary or improved arc lamp mechanisms. If the process is continued until the tube has been reduced to the size indicated at $c$ in Figs. 5 and 6, a number of the thin tubes may be stranded together, as illustrated, and the resulting electrode may be used either as a flexible structure on a drum, etc., or, it may be cut into suitable lengths and used in the ordinary way.

It will be understood from the foregoing that my invention is not dependent upon any particular electrode filling, since this may be chosen as desired; but the invention is particularly applicable and particularly useful with magnetite mixtures or titanium carbid mixtures, with both of which I have obtained excellent results, the electrode material within the tube being in these cases practically as solid as a rock and as homogeneous in appearance as cast material.

In the appended claims I shall refer to my improved electrode as a "drawn electrode," with the understanding that all processes for solidly compacting the material in a tube by compressing the diameter and thereby extending the length of the blank are, for the purposes of my invention, equivalent processes.

What I claim as new and desire to secure by Letters Patent of the United States, is,—

1. A drawn arc-light electrode composed of a metal sheath and arc feeding material compacted therein.

2. A flexible drawn arc-light electrode composed of a metal sheath filled with compacted arc feeding material.

3. A drawn arc-light electrode composed of a sheath of mild steel having arc feeding material compacted therein.

4. A drawn arc-light electrode composed of a sheath of mild steel having a magnetite mixture as the arc feeding material compacted therein.

In witness whereof, I have hereunto set my hand this ninth day of April, 1912.

WILLIAM G. ABBOTT, Jr.

Witnesses:
MATTHEW H. YORK,
J. H. WIPOCK.